Aug. 7, 1945.       R. B. SWIFT       2,381,319
PORTABLE OXYGEN-ACETYLENE GENERATOR
Filed July 2, 1943       3 Sheets-Sheet 1
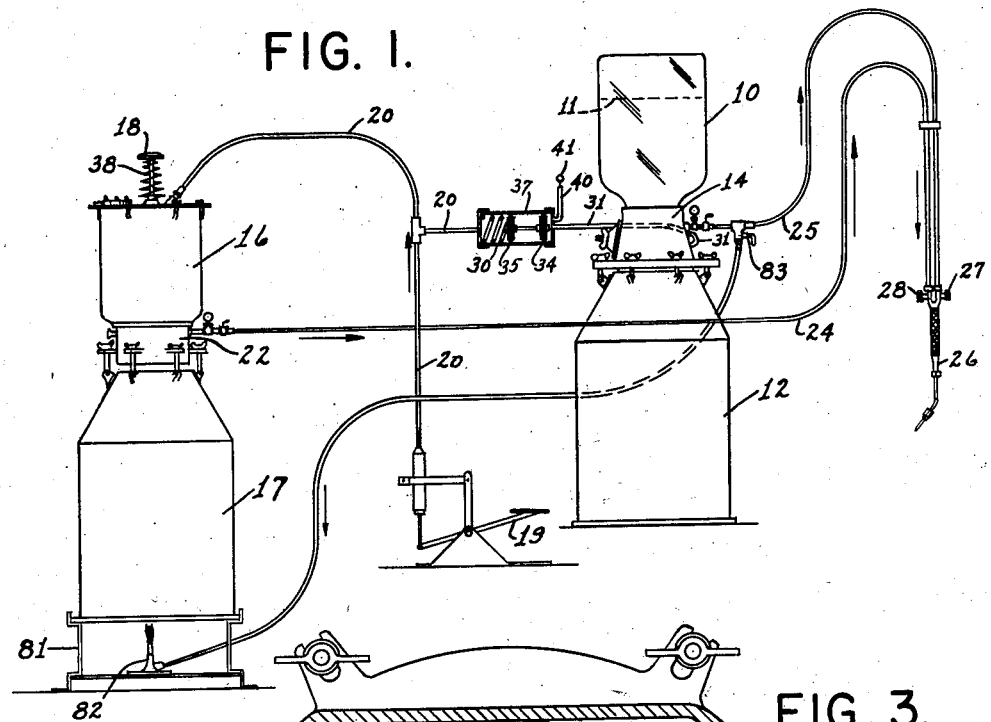
FIG. 1.
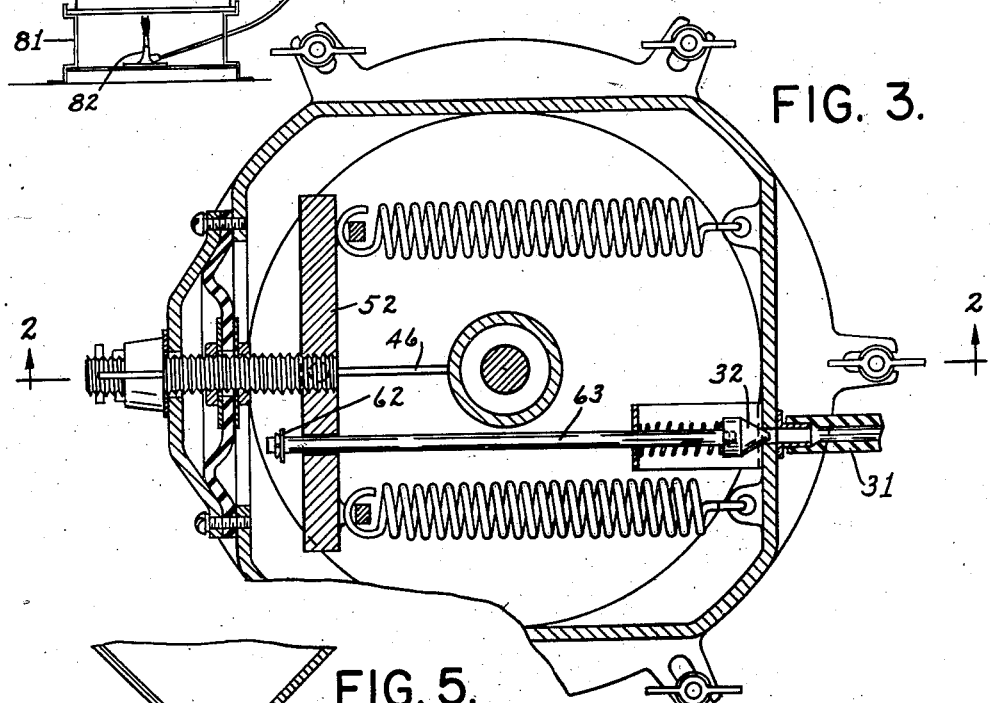
FIG. 3.
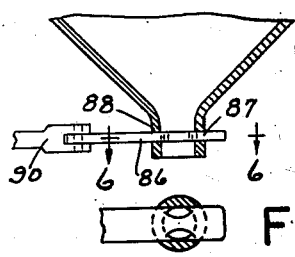
FIG. 5.
FIG. 6.
INVENTOR
RODNEY B. SWIFT
BY Clifford C. Bradbury
ATTORNEY.

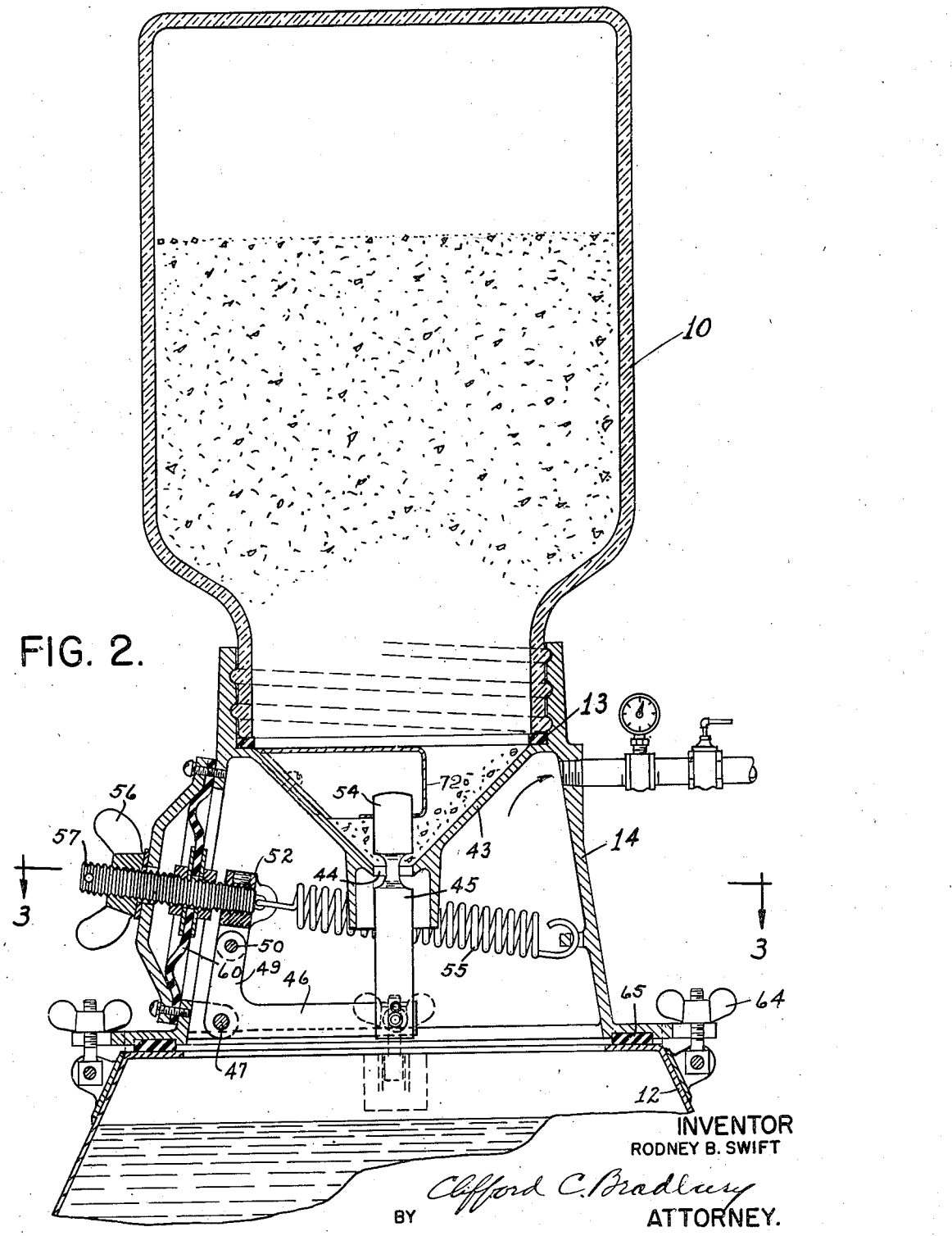

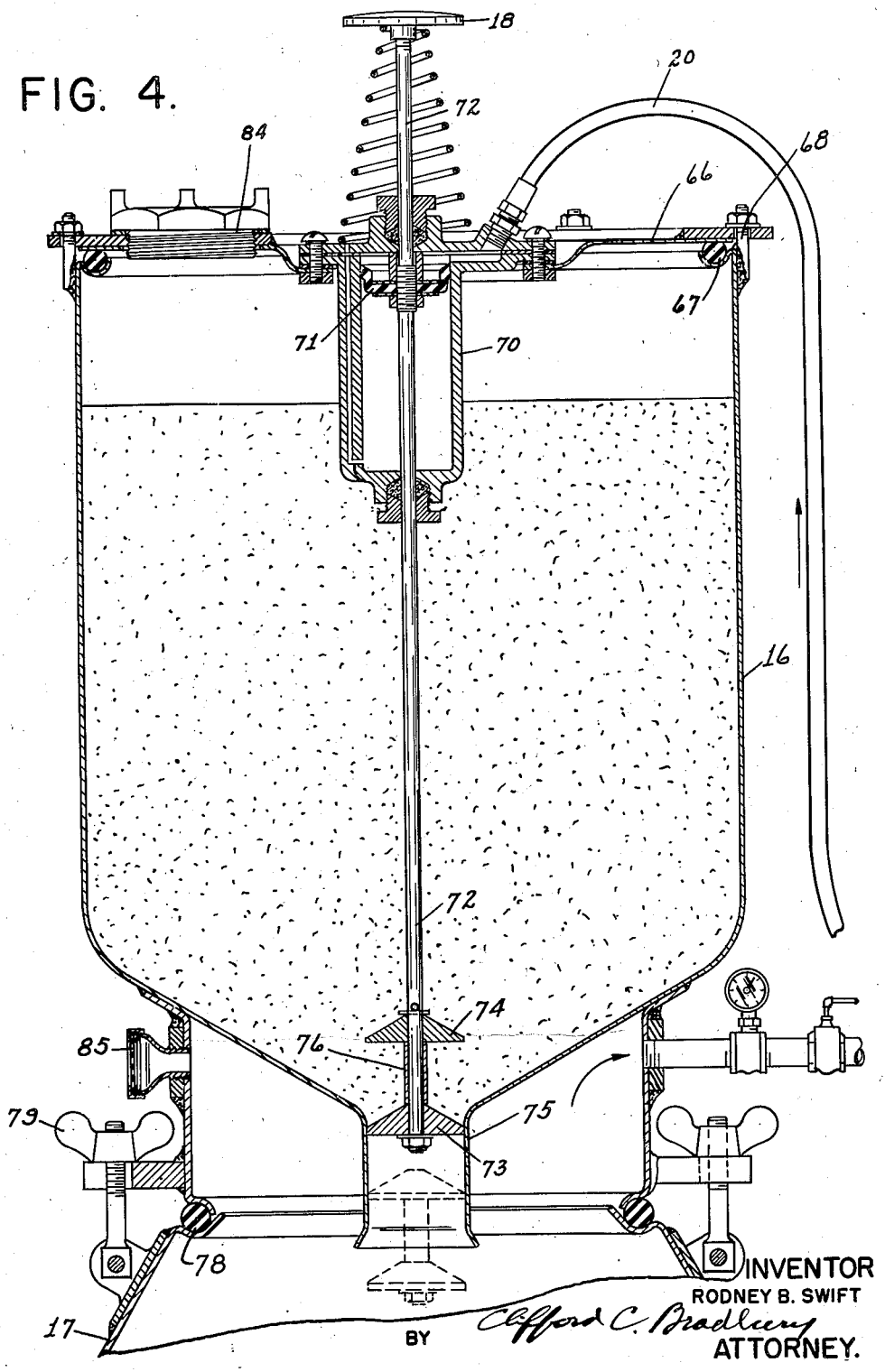

Patented Aug. 7, 1945

2,381,319

UNITED STATES PATENT OFFICE 2,381,319

PORTABLE OXYGEN-ACETYLENE GENERATOR

Rodney B. Swift, West Alexandria, Ohio

Application July 2, 1943, Serial No. 493,257

10 Claims. (Cl. 48—53.3)

My invention relates to portable oxygen-acetylene generators.

One object of my invention is to provide a combined oxygen and acetylene generator in which the rate of flow of acetylene controls the rate of generation of oxygen.

Another object of my invention is to provide an acetylene generator which is inexpensive and simple to manufacture and maintain and so simple in its operation that it can be satisfactorily used by unskilled and inexperienced operators.

Another object of my invention is to provide a novel feed mechanism for properly admitting calcium carbide to water for generating the acetylene gas.

Another object of my invention is to provide a foot, a hand and an automatically operated sodium peroxide feed mechanism.

When a sodium peroxide oxygen generator is first started it requires some artificial heat, particularly if the water into which the sodium peroxide discharges is cold. After the oxygen generator has been operating for a short time it maintains its own heat through chemical reaction. In order conveniently to start the oxygen generator I provide a burner which is initially connected with the acetylene gas generator.

My invention is illustrated in the accompanying drawings in which corresponding parts in the several views are designated by the same characters, and in which Fig. 1 is an elevation of my invention with the oxygen and acetylene generators connected together as in use.

Fig. 2 is a vertical section through the acetylene generator with its water compartment partly broken away.

Fig. 3 is a horizontal section taken on the line 3—3 of Fig. 2.

Fig. 4 is a vertical section taken through the oxygen generator with the water compartment partly broken away.

Fig. 5 is a modified form of carbide feed valve which may be substituted for the feed valve of Fig. 2.

Fig. 6 is a section taken on the line 6—6 of Fig. 5.

Referring more particularly to Fig. 1, the acetylene generator comprises an inverted glass jar or bottle 10 containing dry calcium carbide to a level indicated by the line 11. The calcium carbide is fed automatically to the liquid container 12 through an intermediate compartment 14 in which is located feeding mechanism to be hereinafter described. The neck of the jar or bottle 10 is preferably threaded into the upper portion of the intermediate compartment 14 against a rubber gasket 13 for sealing purposes.

The oxygen generator comprises a metallic receptacle 16 for sodium peroxide in granular form and a liquid container 17 to which the sodium peroxide is manually fed either by the operation of a hand plunger 18 or a foot pedal 19 so arranged as to force a fluid similar to the ordinary hydraulic brake fluid, through a pipe 20 into a cylinder to be hereinafter described. The intermediate compartment 22 of the oxygen generator, and the intermediate compartment 14 of the acetylene generator are connected through flexible hose 24 and 25 to a nozzle 26 at which the flow of acetylene and oxygen is suitably controlled by a pair of valves 27 and 28.

Because there is a considerable delay between the time that a charge of sodium peroxide is dumped into the water of container 17 and the time that oxygen is produced, it is not feasible automatically to control the discharge of sodium peroxide by the pressure of the oxygen produced. In accordance with my invention a limited amount of sodium peroxide is introduced into the liquid container 17 under the control of pressure produced in the acetylene generator by the discharge of calcium carbide into the liquid container 12. To accomplish this automatic operation I connect a cylinder 30 by means of a tube 31 to the discharge side of a valve 32, Fig. 3, opened as hereinafter described whenever the pressure in the intermediate compartment 14 rises above a predetermined value. The acetylene pressure acts upon the piston 34 forcing the piston 35 to the left, Fig. 1, and causing the liquid, such as brake fluid, to be expelled from the left end of the cylinder 30 through the pipe 20 and into the operating cylinder of the oxygen generator to cause the dumping of a predetermined amount of sodium peroxide in the manner to be hereinafter described. The wall of cylinder 30 is provided with an opening 37 so positioned that it is uncovered by the piston 34 when the pistons 34 and 35 are moved to their left-hand positions. This opening in conjunction with the pressure opened valve 32 serves as a safety valve for the acetylene generator since it constitutes a free discharge to atmosphere for the acetylene whenever it has reached a pressure sufficient to hold the pistons 34 and 35 in their left-hand positions against the force of the spring 38 acting on the hand plunger 18 on top of the oxygen generator. The cylinder 30 is also provided with a tiny leak tube 40 for permitting the very gradual escape of acetylene which allows the pistons 34 and 35 gradually to return to their right-hand positions. The leak tube 40 is preferably made by inserting a kinky wire into a drilled opening a few thousandths of an inch larger than the wire. If this tiny opening becomes blocked, the wire 41 may be pulled out by its loop, wiped off and reinserted, whereupon the tiny leak will be reestablished.

Referring now more particularly to Fig. 2, the mechanism for automatically discharging calcium carbide from the jar or bottle 10 into the liquid container 12 comprises a funnel member 43 formed integrally with the walls of the intermediate compartment 14, the bottom of this funnel being provided with an opening 44 into which a valve member 45 is inserted by the counter-clockwise rotation of a bell-crank 46 pivoted at 47 on the housing of the intermediate compartment 14. The upwardly extending arm 49 of the bell-crank 46 is pivoted at 50 upon a crosshead 52, Fig. 3, such that the movement of the crosshead 52 to the left, Fig. 2, causes the valve member 45 to move upwardly into and close the opening 44, thus to cut off the discharge of calcium carbide from the jar or bottle 10. The valve 45 is provided with a head portion 54 normally standing above the opening 44 and adapted to close that opening when the crosshead 52 is moved to the right, Fig. 2. When the acetylene generator is out of use the crosshead 52 is moved to the right under the influence of springs 55 upon the unscrewing of the thumb screw 56 along the screw 57. When it is desired to place the acetylene generator into use the thumb screw 56 is tightened, thus moving the crosshead 52 to the left with the consequent upward movement of the head 54 of the valve 45 permitting calcium carbide to fall into the liquid in the container 12. Acetylene gas is immediately generated creating a pressure on the inner side of the diaphragm 60 causing the screw 57 and crosshead 52 to move to the left against the tension of the springs 55 and causing the valve 45 to close the opening 44 cutting off the flow of carbide into the liquid container 12. The movement of the crosshead to the left causes its engagement with the head 62 on the stem 63 of pressure relief valve 32, moving that valve off its seat and permitting a small amount of acetylene to pass through the conduit 31 into the cylinder 30 to bring about the feeding of a definite quantity of sodium peroxide in the oxygen generator. The liquid container 12 is attached to the lower part of the intermediate compartment 14 by means of thumb screws 64 which compress a rubber gasket 65 for creating a seal between the intermediate compartment 14 and the liquid container 12.

Referring more particularly to Fig. 4, the metallic receptacle 16 of the oxygen generator is provided with a lid 66 held against a rubber ring 67 by suitable retainers 68. The lid 66 is provided at its central part with a depending cylinder 70, the top of which is in communication with the pipe 20. Within the cylinder 70 a piston 71 is secured to the piston rod 72 which terminates in the hand piece 18. The lower end of the piston rod 72 carries a pair of cone-shaped heads 73 and 74 which are closely fitted to the neck 75 at the lower end of the metallic receptacle 16. The heads 73 and 74 are separated by a sleeve 76 which is selected to the proper length that the amount of sodium peroxide contained between the heads 73 and 74 when they are both within the neck 75 is sufficient to produce substantially the amount of oxygen required for one charge of acetylene in the acetylene generator. The heads 73 and 74 and the sleeve 76 constitute a measuring valve for the sodium peroxide.

The intermediate compartment 22 of the oxygen generator is suitably soldered or welded to the metallic receptacle 16 and removably held against a rubber gasket 78 in a groove about the top of the liquid container 17 by suitable thumb screws 79 which permit access to the liquid container 17 for cleaning and refilling. A suitable stand 81 may be used for holding the container 17 off the floor to a proper height for a Bunsen burner 82 which is connected through a valve 83 with the source of acetylene from the acetylene generator. A rupture device 85 is provided in the wall of the compartment 22 to burst in the event of an excessive pressure of oxygen.

In placing my oxygen-acetylene generator into use the operator having filled the liquid containers partly full of water and having placed calcium carbide in the jar or bottle 10 and sodium peroxide in the metallic receptacle 16 through the opening normally closed by the removable screw cap 84, first depresses the hand piece 18 one or more times to dump a limited amount of sodium peroxide into the liquid container of the oxygen generator. Unless the weather is warm the generation of oxygen will be very slow until the temperature of the water has been raised to above 70° Fahrenheit. Because my oxygen-acetylene generators are frequently used for airplane emergency welding it is often necessary to bring the temperature of the water in the oxygen generator to above 70° Fahrenheit without access to an external source of hot water. To start the acetylene generator the thumb screw 56 is pulled outwardly and released, thus moving the valve 45 from the position in which the head 54 closes the opening 44 and permitting a small amount of calcium carbide to be discharged into the water in the liquid container 12. When enough acetylene has been generated properly to heat up the water in the oxygen generator the thumb screw 56 is tightened to the proper position to maintain an acetylene pressure suitable for welding. As the pressure in the intermediate compartment 14 decreases to a predetermined amount the valve 45 will lower below its seat until a discharge of calcium carbide is established through the opening 44. Because of the character of calcium carbide the discharge through the opening 44 will not start until the valve 45 has lowered considerably below the edge of the opening 44, but when the flow starts a substantially predetermined amount of calcium carbide will be discharged into the water of the acetylene generator, thus raising the acetylene pressure slightly causing the diaphragm 60 and crosshead 52 to move to the left and causing the bell-crank 46 to rotate in a counter-clockwise direction closing the opening 44. The size of the diaphragm 60 is such that a very slight variation in acetylene pressure causes a substantial movement of the crosshead 52. When the crosshead 52 engages the head 62 on the valve stem 63 the valve 32 is opened, allowing a shot of acetylene under pressure to enter the right end of cylinder 30, moving the pistons 34 and 35 to the left, forcing operating fluid through the pipe 20 into the space above the piston 71 of the oxygen generator and causing the discharge of an amount of sodium peroxide contained between the heads 73 and 74 to be discharged into the water of the oxygen generator. Each time that the acetylene generator passes through one cycle it causes the oxygen generator to pass through one cycle. Each of the generators is provided with a pressure gauge so that the operator can observe the pressures of each of the gases. Because of the difficulty in providing an absolutely balanced feed for the sodium peroxide under the influence of the feed of calcium carbide, it is desirable that the feed of sodium peroxide be adjusted so that it is slightly less than the required rate to supply the necessary oxygen for the amount of acetylene to be used. For this reason the oxygen generator is provided with a foot pedal 19 which may be depressed by the operator to cause a flow of operating fluid to the cylinder 70 of the oxygen generator whenever the oxygen falls below the desired pressure. In order to guide the head 54 of the valve 45 the bracket 72 is provided. This bracket also prevents the calcium carbide from resting on the upper end of the head 54.

In Figs. 5 and 6 I have illustrated a modification of the valve mechanism of Fig. 2. In accordance with this modification a plate 86 extends through a slot 87 in a downwardly projecting neck 88 formed at the bottom of the funnel member 43. The plate 86 being so shaped as to accomplish the same result in its movement to the right that is accomplished by the upward movement of the valve member 45 in the embodiment illustrated in Fig. 2. The connecting rod 90 of Fig. 5 would be attached to the crosshead by the pivot 50 which in Fig. 2 connects the depending end 49 of the bell-crank 46 with the crosshead 52.

While I have shown and described my invention with respect to certain illustrated details of construction, it is to be understood that I do not wish to be unduly limited thereto, many modifications being possible without departing from the spirit or scope of my invention.

I claim:

1. In an oxygen-acetylene generator, a source of oxygen gas and a source of acetylene gas, a nozzle to which said sources are connected, a receptacle for calcium carbide, a water receptacle beneath it, automatic feed mechanism for feeding the calcium carbide into the water under control of the pressure of acetylene gas produced by the reaction between the calcium carbide and the water, a receptacle for sodium peroxide, a second water receptacle beneath it, and feed mechanism for discharging measured quantities of sodium peroxide into the water of the second receptacle, and means under the control of the pressure of the acetylene gas for controlling the discharge of sodium peroxide into the water of the second receptacle.

2. In an oxygen-acetylene generator in combination, a receptacle for sodium peroxide, a water receptacle beneath it, means to discharge measured quantities of sodium peroxide into the water, an acetylene gas generator having a chamber in which the pressure rises and falls periodically responsive to the delivery of calcium carbide thereto, and means operated responsive to each rise in pressure of the acetylene gas for operating the measured quantities of sodium peroxide discharging means.

3. In an oxygen generator, a receptacle for an oxygen containing compound, a receptacle beneath it for liquid, a measuring valve for discharging measured quantities of oxygen containing compound into the liquid whereby free oxygen is generated, a cylinder, a piston in the cylinder, a rod connecting the piston with the measuring valve, a fluid pump connected with the cylinder, and a foot pedal for operating said pump to force fluid into said cylinder to operate the measuring valve.

4. In an acetylene generator, a compartment containing calcium carbide, a compartment beneath it containing water, a valve controlling the discharge of calcium carbide into the water, a diaphragm for controlling said valve acted upon by pressure of acetylene produced by the discharge of calcium carbide into the water, a source of oxygen gas, a conduit leading from the space above the water in said water receptacle and controlled by the position of said diaphragm, and means connected with said conduit for controlling the pressure of the oxygen from said oxygen source.

5. In an acetylene generator, a water compartment and a calcium carbide compartment above it, a partition between said compartments having an opening therein, a feed valve controlling said opening, a wall movable under the influence of pressure in said compartments, a pressure relief valve for permitting the escape of gas from said compartments, and mechanical connections between said movable wall and said valves for closing the feed valve and opening the pressure relief valve when the movable wall is moved outwardly under the influence of pressure in said compartments.

6. In an acetylene generator, a water compartment and a calcium carbide compartment above it, a partition between said compartments having an opening therein, a feed valve controlling said opening, a wall movable under the influence of pressure in said compartments, a pressure relief valve for permitting the escape of gas from said compartments, connections between said movable wall and said valves for closing the feed valve and opening the pressure relief valve when the movable wall is moved outwardly under the influence of pressure in said compartments, a conduit in communication with the external side of said pressure relief valve, a cylinder to which said conduit connects, a piston movable in said cylinder by gas from said conduit, said cylinder having an opening through its wall exposed to the working chamber of said cylinder when the piston is moved to its extreme position under the influence of gas pressure, and an oxygen feed mechanism controlled by the movement of said piston.

7. In an acetylene generator, a water compartment and a calcium carbide compartment above it, a partition between said compartments having an opening therein, a feed valve controlling said opening, a wall movable under the influence of pressure in said compartments, a pressure relief valve for permitting the escape of gas from said compartments, connections between said movable wall and said valves for closing the feed valve and opening the pressure relief valve when the movable wall is moved outwardly under the influence of pressure in said compartments, a conduit in communication with the external side of said pressure relief valve, a cylinder to which said conduit connects, a piston movable in said cylinder by gas from said conduit, said cylinder having an opening through its wall exposed to the working chamber of said cylinder when the piston is moved to its extreme position under the influence of gas pressure, means urging said piston against the pressure of the gas in the cylinder, said cylinder and conduit being provided with a vent of small size whereby the gas will gradually escape from the cylinder to permit the piston therein to move to its normal position while the pressure relief valve remains closed, and an oxygen feed mechanism controlled by the movement of said piston.

8. In an oxygen generator, a receptacle for an oxygen containing compound, a receptacle beneath it for liquid, a measuring valve for discharging measured quantities of oxygen containing compound into the liquid whereby free oxygen is generated, a cylinder, a piston in the cylinder, a rod connecting the piston with the measuring valve, a hand piece on said rod, a spring for holding the rod and piston in a normal position in which the measuring valve fills with the oxygen containing compound, the depression of said hand piece serving to move the measuring valve to position in which the oxygen containing compound discharges into the receptacle for liquid, and means to apply liquid pressure on said piston for moving said measuring valve.

9. In an oxygen generator, a receptacle for an oxygen containing compound, a receptacle beneath it for liquid, a measuring valve for discharging measured quantities of oxygen containing compound into the liquid whereby free oxygen is generated, a cylinder, a piston in the cylinder, a rod connecting the piston with the measuring valve, a hand piece on said rod, a spring for holding the rod and piston in a normal position in which the measuring valve fills with the oxygen containing compound, the depression of said hand piece serving to move the measuring valve to position in which the oxygen containing compound discharges into the receptacle for liquid, and means to apply liquid pressure on said piston for moving said measuring valve, and a foot operated pump for creating pressure on said piston to move said measuring valve.

10. In an oxygen generator, a receptacle for an oxygen containing compound, a receptacle beneath it for liquid, a measuring valve for discharging measured quantities of oxygen containing compound into the liquid whereby free oxygen is generated, a cylinder, a piston in the cylinder, a rod connecting the piston with the measuring valve, a hand piece on said rod, a spring for holding the rod and piston in a normal position in which the measuring valve fills with the oxygen containing compound, the depression of said hand piece serving to move the measuring valve to position in which the oxygen containing compound discharges into the receptacle for liquid, and means to apply liquid pressure on said piston for moving said measuring valve, and an automatic pump for creating pressure on said piston in accordance with the demand for oxygen to move said measuring valve.

RODNEY B. SWIFT.